United States Patent
Maziers

(10) Patent No.: US 8,182,733 B2
(45) Date of Patent: May 22, 2012

(54) USE OF THERMOPLASTIC COMPOSING POLYETHLENE GLYCOL AS ADDITIVE

(75) Inventor: Eric Maziers, Seneffe (BE)

(73) Assignee: Total Petrochemicals Research Feluy, Seneffe (Feluy) (BE)

(*) Notice: Subject to any disclaimer, the term of this patent is extended or adjusted under 35 U.S.C. 154(b) by 626 days.

(21) Appl. No.: 11/597,151

(22) PCT Filed: May 30, 2005

(86) PCT No.: PCT/EP2005/052461
§ 371 (c)(1),
(2), (4) Date: May 28, 2009

(87) PCT Pub. No.: WO2005/118710
PCT Pub. Date: Dec. 15, 2005

(65) Prior Publication Data
US 2009/0295008 A1 Dec. 3, 2009

(30) Foreign Application Priority Data
May 28, 2004 (EP) .................................. 04102390

(51) Int. Cl.
*B28B 1/20* (2006.01)
(52) U.S. Cl. ..................... 264/310; 264/209.2; 264/302; 264/311; 264/312; 264/503
(58) Field of Classification Search ............ 264/310, 264/503, 209.2, 311, 312, 302
See application file for complete search history.

(56) References Cited

U.S. PATENT DOCUMENTS

| | | | |
|---|---|---|---|
| 3,536,689 A | 10/1970 | Stanley | |
| 3,956,448 A * | 5/1976 | Larson | 264/138 |
| 4,403,007 A * | 9/1983 | Coughlin | 428/95 |
| 5,550,193 A | 8/1996 | Goyal | |
| 5,883,165 A * | 3/1999 | Krohnke et al. | 524/111 |
| 6,444,733 B1 * | 9/2002 | Stadler | 524/100 |
| 6,719,941 B1 | 4/2004 | Frohaug et al. | |
| 2004/0086671 A1* | 5/2004 | Brown et al. | 428/35.7 |

FOREIGN PATENT DOCUMENTS

| | | |
|---|---|---|
| AU | 200048619 B2 | 1/2001 |
| EP | 0217585 | 4/1987 |
| JP | 62273926 A | 11/1987 |
| JP | 04296525 A * | 10/1992 |
| JP | 06226763 A * | 8/1994 |
| WO | WO 01/12714 | 2/2001 |
| WO | 2004/031293 A1 | 4/2004 |

OTHER PUBLICATIONS

Englsih Abstract of JP 04296525, provided by JPO, 1992.*
Derwent Abstract of JP 04296525, 1992.*
English machine translation of JP 06226763, retrieved from JPO database Feb. 2, 2010.*
http://scienceworld.wolfram.com/chemistry/Ionomer.html.*
http://pslc.ws/mactest/ionomer.htm.*
http://en.wikipedia.org/wiki/Ionomer.*
Patent Abstracts of Japan, vol. 0185, No. 98, Nov. 15, 1994, JP 06226763.

* cited by examiner

*Primary Examiner* — Joseph Del Sole
*Assistant Examiner* — Timothy Kennedy

(57) ABSTRACT

The present invention discloses the use in rotomolding or slush molding applications of a composition comprising a polyolefin, a processing aid and optionally a UV-stabilizer.

15 Claims, 4 Drawing Sheets

USE OF THERMOPLASTIC COMPOSING POLYETHLENE GLYCOL AS ADDITIVE

FIELD OF THE INVENTION

The present invention relates to the use in rotomolding or in slush molding applications of a polyolefin composition comprising a processing aid and optionally a UV-stabilizer. The polyolefin composition can also be used for the production of articles by other processes such as injection molding, cast film, blown film, calendering, sheet extrusion.

BACKGROUND OF THE INVENTION

The present invention primarily concerns the fabrication of articles by rotomolding, also called rotational molding. In rotomolding a premeasured amount of polymer is placed in one half of the mold, the mold is closed and then heated until the polymer is molten. The mold is rotated so as to get good distribution of the polymer in the mold. The mold can be rotated either uniaxially or biaxially, but biaxial rotation is widely preferred, i.e. simultaneous rotation around two perpendicular axes. In the following the mold is cooled, opened and the formed article is removed from the mold. Rotomolding can also be used for multilayer molding, for example by using more than one polymer sequentially. Rotomolding allows the production of hollow articles with good wall thickness distribution and good mechanical properties.

Slush molding is a process that is closely related to rotomolding. In the following the term rotomolding is therefore used to imply both, rotomolding and slush molding applications.

The most widely used polymer in rotomolding is polyethylene. Therefore a lot of effort has been invested to improve the processability of polyethylene in rotomolding.

U.S. Pat. No. 6,362,270 discloses polymer compositions particularly suited for rotomolding. These polymer compositions comprise of at least 94% by weight of one or more thermoplastic polymers and a maximum of 6% by weight of one or more processing additives. The thermoplastic polymer may be selected from copolymers of ethylene and styrene, ethylene and/or $C_3$-$C_{20}$ alpha-olefin homo- or copolymers, nylon, polyethylene terephthalate, polycarbonate, acrylic polymer, polystyrene, and blends of these polymers. Suitable processing additives include aromatic or aliphatic hydrocarbon oils, esters, amides, alcohols, acids, and their organic or inorganic salts as well as silicone oils, polyether polyols, glycerol monostearate (GMS), pentaerytritol monooleate, erucamide, stearamides, adipic acid, sebacic acid, styrene-alpha-methyl-styrene, calcium stearate, zinc stearate, phthalates and blends thereof. The processing additive preferably decreases the composition's melt viscosity and/or elasticity at zero or low shear rates to allow for a reduction in sintering time, cycle time and/or maximum mold temperature.

A recent report (L. T. Pick, E. Harkin-Jones, Third Polymer Processing Symposium, 28-29 Jan. 2004, Belfast, p. 259-268) shows a correlation between the number of bubbles in a rotomolded article and its impact performance, with a higher number of bubbles resulting in lower impact performance. In addition, a high number of bubbles has a negative influence on the optical properties of the finished articles.

There is thus a need to provide a rotomolded article with a reduced number of bubbles.

There is also a need to provide a rotomolded article with improved optical properties.

There is also a need to provide a rotomolded article with improved mechanical properties.

It is an object of the present invention to provide a rotomolded article based on a polyolefin composition with improved processability in rotomolding applications.

It is another object of the present invention to provide a rotomolded article based on a polyolefin composition that improves the sintering and densification processes in rotomolding applications.

It is another object of the present invention to provide a rotomolded article based on a polyolefin composition that reduces bubble formation in the rotomolding process.

It is another object of the present invention to provide a rotomolded article based on a polyolefin composition that improves optical properties of the articles produced by rotomolding applications.

It is another object of the present invention to provide a rotomolded article based on a polyolefin composition that improves mechanical properties of the articles produced by rotomolding applications.

It is another object of the present invention to provide a rotomolded article based on a polyolefin composition that allows reducing cycle time in a rotomolding process.

It is another object of the present invention to provide a process for producing by rotomolding an article with improved properties.

It is yet another object of the present invention to provide a rotomolding process with improved densification and/or sintering processes.

SUMMARY OF THE INVENTION

Accordingly, the present invention provides rotomolded or slush molded articles prepared from a polyolefin composition essentially consisting of
  (a) from 99% by weight to 99.999% by weight of
    (i) a polyolefin or
    (ii) a polyolefin composition comprising from 50% by weight to 99% by weight of a first polyolefin and from 1% by weight to 50% by weight of a different polymer,
  (b) from 0.001% by weight to 1% by weight of a densification aid;
  (c) optionally from 0.025% by weight to 0.500% by weight of one or more UV-stabilizers.

The present invention also discloses the use of that same composition in rotomolding and slush molding.

DETAILED DESCRIPTION OF THE INVENTION

Figure 1:
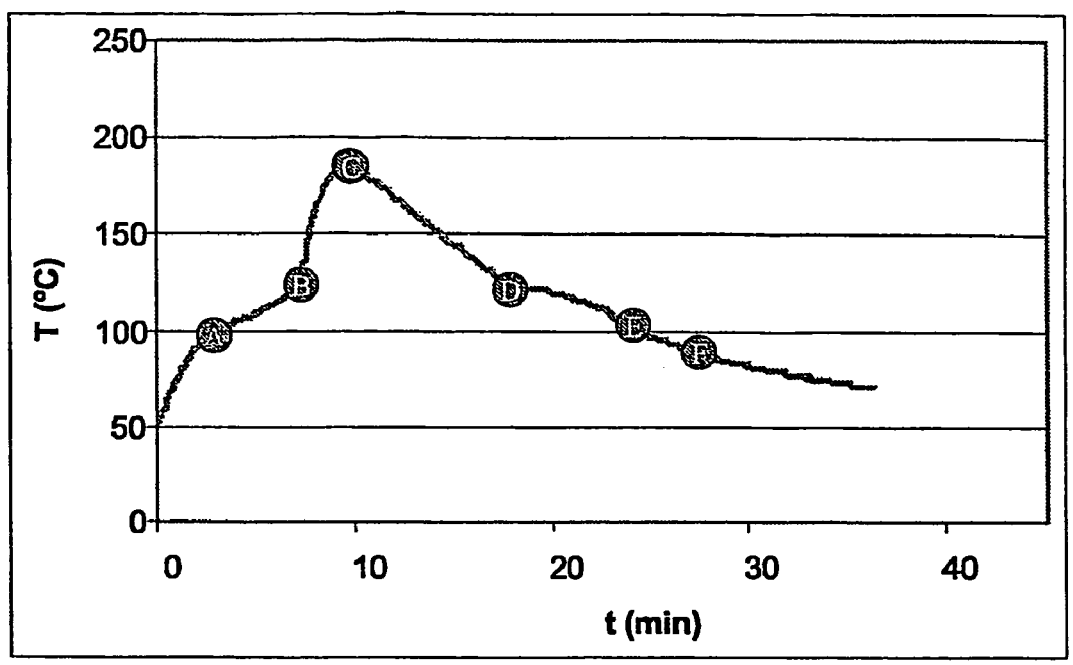
FIG. 1 shows the temperature of air inside a mold expressed in degrees centigrade as a function of time expressed in minutes for a complete cycle in rotomolding applications.

The densification aid comprises a polyethylene glycol, optionally consisting essentially of a mixture of a polyethylene glycol as major component with a minor component selected from the group consisting of polyether-block copolyamide, thermoplastic polyurethane, polyetherester, and fluoropolymer.

By major component it is meant that such a component makes up more than 50% by weight. By minor component it is meant that such a component makes up less than 50% by weight.

Polyether-block co-polyamides are represented by the general formula $$HO—[C(O)\text{-}PA\text{-}C(O)—O\text{-}PEth\text{-}O]_n—H \quad (I)$$

wherein PA represents the polyamide segment and PEth the polyether segment. For example the polyamide segment can be a PA 6, PA 66, PA 11 or a PA 12. The polyether segment can for example be a polyethylene glycol (PEG) or a polypropylene glycol (PPG) or a polytetramethyleneglycol (PTMG). The molecular weight $M_n$ of the polyamide sequence is usually between 300 and 15,000. The molecular weight $M_n$ of the polyether sequence is usually between 100 and 6000. Such materials are commercially available for example from Atofina under the Pebax® trade name.

The copolymers having polyamide blocks and polyether blocks are generally obtained from the polycondensation of polyamide blocks having reactive end groups with polyether blocks having reactive end groups, such as, inter alia:
1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated α,ω-polyoxyalkylene blocks called polyetherdiols; and
3) polyamide blocks having dicarboxylic chain ends with polyetherdiols, the products obtained being, in this particular case, polyetheresteramides.

The polyamide blocks having dicarboxylic chain ends derive, for example, from the condensation of polyamide precursors in the presence of a chain-stopping carboxylic diacid.

The polyamide blocks having diamine chain ends derive, for example, from the condensation of polyamide precursors in the presence of a chain-stopping diamine.

The polymers having polyamide blocks and polyether blocks may also include randomly distributed units. These polymers may be prepared by the simultaneous reaction of the polyether and of the precursors of the polyamide blocks.

For example, a polyetherdiol, polyamide precursors and a chain-stopping diacid may be made to react together. A polymer is obtained which essentially has polyether blocks and polyamide blocks of very variable length, but in addition the various reactants that have reacted randomly, which are distributed in a random fashion along the polymer chain.

A polyether diamine, polyamide precursors and a chain-stopping diacid may also be made to react together. A polymer is obtained which has essentially polyether blocks and polyamide blocks of very variable length, but also the various reactants that have reacted randomly, which are distributed in a random fashion along the polymer chain.

The amount of polyether blocks in these copolymers having polyamide blocks and polyether blocks is advantageously from 10 to 70% and preferably from 35 to 60% by weight of the copolymer.

The polyetherdiol blocks may either be used as such and copolycondensed with polyamide blocks having carboxylic end groups, or they may be aminated in order to be converted into polyetherdiamines and condensed with polyamide blocks having carboxylic end groups. They may also be blended with polyamide precursors and a diacid chain stopper in order to make the polymers having polyamide blocks and polyether blocks with randomly distributed units.

The number-average molar mass $M_n$ of the polyamide blocks is usually between 300 and 15,000, except in the case of the polyamide blocks of the second type. The mass $M_n$ of the polyether blocks is usually between 100 and 6000.

As regards the polyetheresters, these are copolymers having polyester blocks and polyether blocks. They generally consist of soft polyether blocks, which are the residues of polyetherdiols, and of hard segments (polyester blocks), which usually result from the reaction of at least one dicarboxylic acid with at least one chain-extending short diol unit. The polyester blocks and the polyether blocks are generally linked by ester linkages resulting from the reaction of the acid functional groups of the acid with the OH functional groups of the polyetherdiol. The short chain-extending diol may be chosen from the group consisting of neopentyl glycol, cyclohexanedimethanol and aliphatic glycols of formula $HO(CH_2)_nOH$ in which n is an integer varying from 2 to 10. Advantageously, the diacids are aromatic dicarboxylic acids having from 8 to 14 carbon atoms. Up to 50 mol % of the dicarboxylic aromatic acid may be replaced with at least one other dicarboxylic aromatic acid having from 8 to 14 carbon atoms, and/or up to 20 mol % may be replaced with a dicarboxylic aliphatic acid having from 2 to 12 carbon atoms.

As examples of dicarboxylic aromatic acids, mention may be made of terephthalic, isophthalic, dibenzoic, naphthalenedicarboxylic acids, 4,4'-diphenylenedicarboxylic acid, bis(p-carboxyphenyl)methane acid, ethylenebis(p-benzoic acid), 1,4-tetramethylenebis(p-oxybenzoic acid), ethylenebis(paraoxybenzoic acid) and 1,3-trimethylene bis(p-oxybenzoic acid). As examples of glycols, mention may be made of ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexylenedimethanol. The copolymers having polyester blocks and polyether blocks are, for example, copolymers having polyether blocks derived from polyether diols, such as polyethylene glycol (PEG), polypropylene glycol (PPG) or polytetramethylene glycol (PTMG), dicarboxylic acid units, such as terephthalic acid, and glycol (ethanediol) or 1,4-butanediol units. The chain-linking of the polyethers and diacids forms soft segments while the chain-linking of the glycol or the butanediol with the diacids forms the hard segments of the copolyetherester. Such copolyetheresters are disclosed in patents EP 402 883 and EP 405227. These polyetheresters are thermoplastic elastomers. They may contain plasticizers.

Polyetheresters can for example be obtained from Du Pont Company under the Hytrel® trademark.

As regards the polyurethanes, these in general consist of soft polyether blocks, which usually are residues of polyetherdiols, and hard blocks (polyurethanes), which may result from the reaction of at least one diisocyanate with at least one short diol. The short chain-extending diol may be chosen from the glycols mentioned above in the description of the polyether esters. The polyurethane blocks and polyether blocks are linked by linkages resulting from the reaction of the isocyanate functional groups with the OH functional groups of the polyether diol.

Thermoplastic polyurethanes can for example be obtained from Elastogran GmbH under the Elastollan® trade name or from Dow Chemical Company under the Pellethane® trade name.

Polyethylene glycols have the general formula $$H—(OCH_2CH_2—)_nOH \quad (I)$$

Polyethylene glycols are commercially available in a wide range of molecular weights and viscosities. Depending upon their molecular weights polyethylene glycols can be liquid or solid. The polyethylene glycols used in the present invention usually have an average molecular weight from 100 to 2000 g/mol and more preferably from 150 to 700 g/mol. Suitable polyethylene glycols can for example be obtained from Dow Chemical Company or BASF under the Carbowax® and Plurol E® trade names.

The fluoropolymers suited as processing aid in the present invention are for example polymers of vinylidene fluoride ($H_2C=CF_2$) and/or copolymers of vinylidene fluoride and hexafluoropropylene ($F_2C=CF-CF_3$). Though the copolymers of vinylidene fluoride and hexafluoropropylene do not have elastomeric properties they are commonly referred to as "fluoroelastomers". The content of the comonomer hexafluoropropylene in a fluoroelastomer is usually in the range of 30 to 40% by weight. Fluoropolymers suited as processing aids in the current invention are for example commercially available under the Dynamar®, Viton® and Kynar® trade names from Dyneon, DuPont-Dow Elastomers or Atofina.

Polyethylenes prepared with a Ziegler-Natta or with metallocene catalyst or with late transition metal catalyst systems are typically used in rotomolding applications. Other materials can also be used, such as for example polypropylene. Linear low density polyethylene is preferably used as disclosed for example in "Some new results on rotational molding of metallocene polyethylenes" by D. Annechini, E. Takacs and J. Vlachopoulos in ANTEC, vol. 1, 2001.

The preferred polyolefin used in the composition according to the present invention is a homo- or co-polymer of ethylene produced with a catalyst comprising a metallocene on a silica/aluminoxane support. More preferably, the metallocene component is ethylene-bis-tetrahydroindenyl zirconium dichloride or bis-(n-butyl-clopentadienyl) zirconium dichloride or dichloro-(dimethylsilylene)bis(2-methyl-4-phenyl-indenylidene) zirconium dichloride. The most preferred metallocene component is ethylene-bis-tetrahydroindenyl zirconium dichloride.

In this description, the term copolymer refers to the polymerization product of one monomer and one or more comonomers. Preferably the monomer and the one or more comonomers are alpha-olefins with two to ten carbon atoms, with monomer and comonomer(s) being different alpha-olefins. More preferably the monomer is either ethylene or propylene and the one or more comonomers are alpha-olefins with two to eight carbon atoms. Most preferably the monomer is ethylene and the comonomer is either 1-butene or 1-hexene.

The melt index of the polyethylene or polypropylene resin preferably used in the present invention typically falls in the following ranges:
  If the polyolefin of the present invention is a homo- or co-polymer of ethylene, Its melt index MI2 is typically in the range 0.1 to 25 dg/min, preferably in the range 0.5 to 15 dg/min and most preferably in the range 1.5 to 10 dg/min. The MI2 is measured according to ASTM D 1283 at a temperature of 190° C. and a load of 2.16 kg.
  If the polyolefin of the present invention is a homo- or copolymer of propylene, its melt flow index (MFI) is typically in the range 0.1 to 40 dg/min, preferably in the range 0.5 to 30 dg/min and most preferably in the range 1 to 25 dg/min. The MFI is measured according to ASTM D 1283 at a temperature of 230° C. and a load of 2.16 kg.

For the homo- and co-polymers of ethylene that can be used in the present invention, the density is typically in the range 0.910 to 0.975 g/ml and preferably in the range 0.915 to 0.955 g/ml, and most preferably in the range 0.925 to 0.945 g/ml. The density is measured according to ASTM D 1505 at 23° C.

The polyolefins of the present invention may also have a bi- or multimodal molecular weight distribution, i.e. they may be a blend of two or more polyolefins with different molecular weight distributions, which can be blended either physically or chemically, i.e. produced sequentially in two or more reactors.

The polydispersity D of the polyolefins used in the present invention is defined as the ratio Mw/Mn of the weight average molecular weight Mw over the number average molecular weight Mn. It is in the range 2 to 20, preferably 2 to 8, more preferably less than or equal to 5, and most preferably less than or equal to 4, the latter range being typically associated with the preferred metallocene-prepared polyethylene resins.

The polyolefins of the present invention may also comprise other additives such as for example antioxidants, acid scavengers, antistatic additives, fillers, slip additives or anti-blocking additives.

When a polyolefin composition is used as starting material, the composition comprises:
  from 50 to 99% by weight of a first polyolefin, preferably polyethylene;
  from 1 to 50% by weight of a second polymer, which is different from the processing aid, and which is preferably selected from the group consisting of polyamide, copolyamide, a second polyolefin different from the first one, copolymers of ethylene and vinyl acetate (EVA), copolymers of ethylene and vinyl alcohol (EVOH), polystyrene, polycarbonate and polyvinyl chloride (PVC).

It is also possible to use a polyolefin comprising a densification aid as one or more layers of a multilayered rotomolded article with the other layers comprising a polymer preferably selected from the group consisting of polyamide, copolyamide, a second polyolefin different from the first one, copolymers of ethylene and vinyl acetate (EVA), copolymers of ethylene and vinyl alcohol (EVOH), polystyrene, polycarbonate and polyvinyl chloride (PVC).

The one or more UV-stabilizers can be selected from any known UV-stabilizer known in the art. The preferred UV-stabilizers are hindered amine light stabilizers (HALS). Commercially available examples of HALS include Chimassorb® 944, Tinuvin® 622 or Tinuvin® 783 from Ciba Specialty Chemicals.

Surprisingly, it has been found that the addition of 0.001% by weight to 1% by weight of a processing aid improves the processability of a polyolefin in rotomolding by modifying the sintering and the densification behavior.

The use of a processing aid according to the present invention results in cycle time reductions of at least 10%, preferably by at least 20%. In order to obtain the same number of bubbles in the rotomolded articles the peak internal air temperature (PIAT) can be reduced by at least 10 degrees centigrade.

Even more surprisingly, it has been found that the further addition of from 0.025% by weight to 0.500% by weight of one or more UV-stabilizers to the composition described hereabove comprising 0.001% by weight to 1% by weight of a processing aid even further improves the processability of the polyolefin in rotomolding.

It is believed that there is a synergy between the processing aid and the UV-stabilizer, and it is thus preferred to use both.

In rotomolding a premeasured amount of polymer is placed in one half of the mold, the mold is dosed and then heated until the polymer is molten. The mold is rotated so as to get an even distribution of the polymer in the mold. The mold can be rotated either uniaxially or biaxially, but biaxial rotation is widely preferred, i.e. simultaneous rotation around two perpendicular axes. In the following step the mold is cooled, opened and the formed article is removed from the mold.

The rotomolding cycle comprises three main steps, each of which has an impact on cycle time and the properties of the so-produced article. The three steps comprise:
sintering or coalescence,
densification or bubble removal, and
crystallization.

This is Illustrated in FIG. 1 giving the air temperature in the mold, expressed in degrees centigrade, as a function of time, expressed in minutes, during an exemplary molding cycle. The first inflexion in the curve noted as point A marks the beginning of the sintering or coalescence of the polymer particles. Sintering in the present application represents the coalescence of the polymer particles. The next inflexion in the curve noted as point B marks the beginning of the densification process of the molten polymer. Densification in the present application means bubble removal. Throughout this application sintering and densification are seen as two distinct processes; they vary independently with the rotomolding parameters and with the resin properties.

Point C on the curve represents the Peak Internal Air Temperature (PIAT), followed by point D that marks the beginning of the crystallization process. Point E is associated with the time at which the rotomolded article is completely solidified and starts receding from the walls of the mold. Point F marks the opening of the mold, i.e. the end of the rotomolding cycle.

The present invention is mostly concerned with the modification of the polymer behavior in the sintering (coalescence) and densification (bubble removal) phases of the rotomolding cycle and slush molding cycle. Sintering is measured according to a method described for example by Bellehumeur et al. (C. T. Bellehumeur, M. K. Bisaria, J. Vlachopoulos, Polymer Engineering and Science, 36, 2198, 1996). Densification and bubble formation has been discussed by Kontopoulo et al. (M. Kontopoulo, E. Takacs, J. Vlachopoulos, Rotation, 28, Jan. 2000). During melting air pockets or bubbles are trapped, thus delaying the formation of a homogeneous melt and also affecting the aesthetical and/or mechanical properties of the finished product.

For the present invention a charge-coupled device (CCD) camera was used to characterize the properties of polyolefin powders during a rotomolding cycle or during sintering and/or densification simulations.

EXAMPLES

Characterization of the processing behavior was analyzed using a megapixel progressive scan interline CCD with on-chip circuits commercially available from Kodak. It has the following characteristics:
architecture: interline CCD, progressive scan, non-interlaced
pixel count: 1000 (H)×1000 (V)
pixel size: 7.4 μm(H)×7.4 μm(V)
photosensitive area: 7.4 mm(H)×7.4 mm(V)
output sensitivity: 12 μV/electron
saturation signal 40,000 electrons
dark noise: 40 electrons rms
dark current (typical): <0.5 nA/cm$^2$
dynamic range: 60 dB
quantum efficiency at 500, 540, 600 nm 36%, 33%, 26%
blooming suspension: 100×
image lag: <10 electrons
smear: <0.03%
maximum data rate: 40 MHz/channel (2 channels)
integrated vertical dock drivers
integrated correlated double sampling (CDS)
integrated electronic shutter driver The high performance 15-bit (16 bits minus 1 bit for control) CCD sensor with transparent gate electrode provides 32,768 unsigned levels of gray, allows the acquisition of about 10,000 frames/s and covers a broad spectrum of from 400 to 1000 nm.

Figure 2:
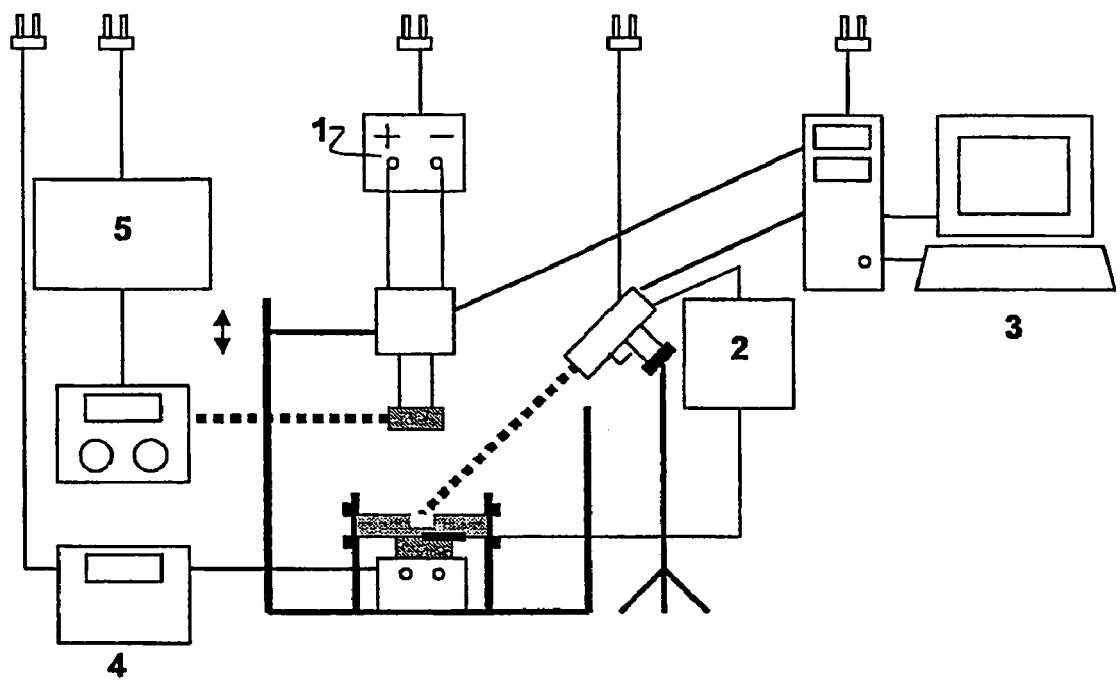
FIG. 2 shows a camera set-up used to study sintering and densification behavior.
Figure 3:
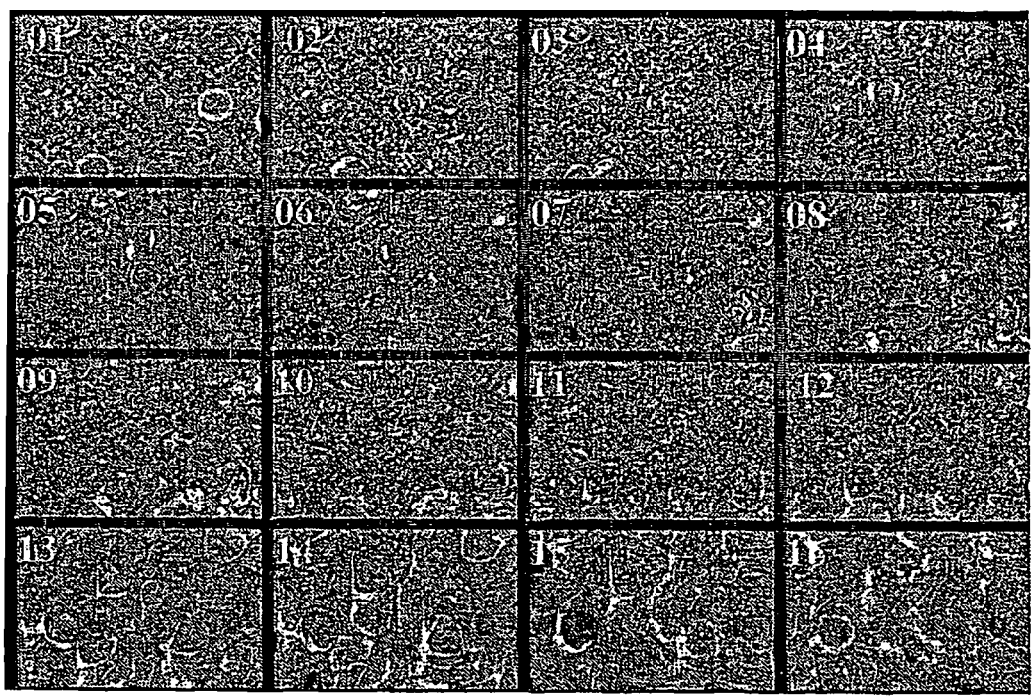
FIG. 3 represents a sequence of photographs showing the coalescence process.
Figure 4:
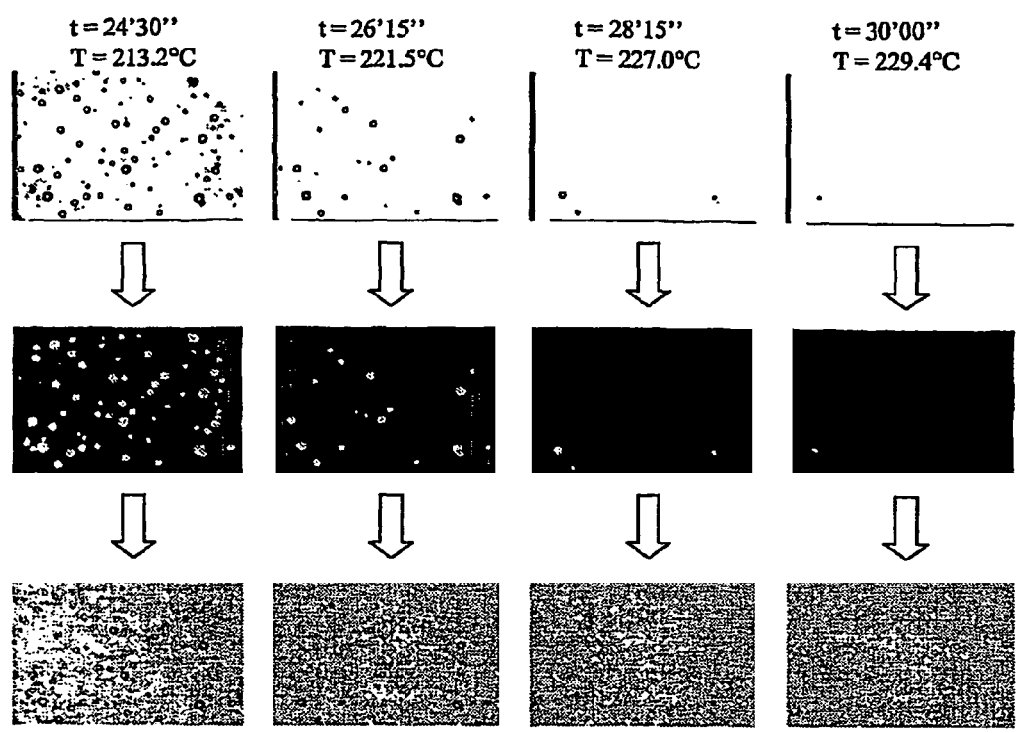
FIG. 4 represents a series of photographs showing the bubble removal process.

The camera set-up used to study sintering and densification behavior is illustrated in FIG. 2 with the CCD camera (1), the IR probe (2), the computer (3), the heating system (4) and the annular lighting system (5). A typical example for sintering is shown in FIG. 3 and a typical example for densification or bubble removal in FIG. 4.

The progressive disappearance of bubbles as a function of time and temperature is clearly and instantaneously followed. In addition to the visual aspect, the computer instantaneously produces a set of parameters resulting from picture analysis. These parameters are explained in Table I.

TABLE I

| Parameter | Unit | Description |
|---|---|---|
| Ex | — | picture number |
| t | min | time of picture |
| T | ° C. | IR temperature of sample |
| N | — | number of bubbles on the picture |
| Na | mm$^{-2}$ | number of bubbles per mm$^2$ |
| A | μm$^2$ | total area covered by bubbles |
| Aa | — | percentage of total picture area covered by bubbles |
| D$_{av}$ | μm | average distance between 2 bubbles |
| S | μm$^2$ | average area of one bubble |
| Cr | μm | perimeter of one bubble based on Crofton's integral |
| D$_{eq}$ | μm | equivalent diameter of one bubble |
| L | μm | largest side of one bubble |
| W | μm | smallest side of one bubble |
| LO | degree | orientation of the largest side |
| WO | degree | orientation of the smallest side |

The average distance between two bubbles $D_{av}$ is defined as $$D_{av}=4(1-Aa)/Sv$$

wherein $Sv=4\pi(D_{eq}/2)^2 \cdot Aa/((4\pi/3)(D_{eq}/2)^3)$
wherein the equivalent bubble diameter $D_{eq}$ is defined in terms of the average surface of one bubble S by the equation $S=4\pi(D_{eq}/2)^2$.

The base polyethylenes were supplied as pellets. The pellets were ground at 40 to 80° C. on commercial grinding equipment, e.g. a Wedco Series SE machine, to a powder with grain sizes from 100 μm to 800 μm. The processing aid or a blend of processing aids and a UV-stabilizer or a blend of UV-stabilizers were added to the powder in commercial mixing equipment.

Irganox® B 215 is a blend of Irgafos® 168 and Irganox® 1010 and is commercially available from Ciba Specialty Chemicals. Tinuvin® 783 is a UV-stabilizer commercially available from Ciba Specialty Chemicals. Cyasorb THT® 4611 and Cyasorb THT® 4802 are UV-stabilizers commercially available from Cytec Industries. Carbowax® E300 can be obtained from Dow Chemical Corporation.

Examples 1 to 4 and Comparative Example 1

The polyethylene used for examples 1 to 4 and comparative example 1 was a monomodal polyethylene with a MI2 of 8.0 dg/min and a density of 0.934 g/ml; it was produced using a supported metallocene catalyst system. It is commercially available from Atofina under the name Finacene® M3582.

The processing aids, UV-stabilizers and other additives are given in Table II, together with their respective amounts.

The samples were evaluated on a 10 L canister prepared by rotomolding using a commercial rotomolding equipment. Peak Internal Air Temperature (PIAT) was 210° C. in all cases.

TABLE II

|  | Comp. Ex. 1 | Ex. 1 | Ex. 2 | Ex. 3 | Ex. 4 |
|---|---|---|---|---|---|
| MI2 (dg/min) | 8.0 | 8.0 | 8.0 | 8.0 | 8.0 |
| Density (g/ml) | 0.934 | 0.934 | 0.934 | 0.934 | 0.934 |
| Irganox ® B 215 (ppm) | 1500 | 1500 | 1500 | 1500 | 1500 |
| Zinc stearate (ppm) | 1500 | | | | |
| Carbowax ® E300 (ppm) | | 500 | 1000 | 500 | 500 |
| Tinuvin ® 783 (ppm) | | | | 1500 | |
| Cyasorb THT ® 4611 (ppm) | | | | | 1000 |

Using the polymer compositions of examples 1 to 4 rotomolded articles with a low number of bubbles could be obtained.

The invention claimed is:

1. A method for the preparation of a molded article formed of an olefin polymer comprising:
   a) providing a molding feedstock comprising a particulate α-olefin polymer composition, wherein the particulate olefin polymer is selected from ethylene homopolymers, propylene homopolymers, or copolymers of ethylene or propylene and $C_2$-$C_8$ olefin polymers;
   b) providing a densification aid comprising polyethylene glycol,
   c) introducing said olefin polymer composition and said densification aid in an amount of less than 1 weight percent based upon the amount of said olefin polymer into a mold cavity configured to provide a mold of a desired shape;
   d) heating said olefin polymer composition in the presence of said densification aid in said mold cavity to a temperature sufficient to provide a molten state to form a molded article configured to the shape of said mold cavity, wherein the mold is rotated during the heating of said olefin polymer to a molten state;
   e) thereafter cooling said molten polymer composition within the confines of said mold cavity to a temperature effective to solidify said olefin polymer composition within the confines of said mold cavity; and
   f) retrieving said solidified molded article from said mold cavity, wherein subsequent to the introduction of said olefin polymer composition and said densification additive into said mold cavity, said polymer is heated to a sintering temperature in which individual particles of said olefin polymer are coaleased followed densification of said molten polymer and the increase of the temperature in said mold cavity to a peak internal air temperature within said mold cavity followed by the cooling of said mold cavity to a crystallization temperature for the solidification of said molten polymer to produce said molded article wherein the peak internal air temperature within said mold cavity to produce a designated number of air bubbles within said molten polymer is reduced by an increment of at least 10° C. from the peak internal air temperature required to produce the designated number of air bubbles for a polymer molded under identical conditions without the introduction of said densification aid into said mold cavity.

2. The method of claim 1 wherein said densification aid comprises said polyethylene glycol as a major component and in addition comprises a minor component selected from the group consisting of a fluoropolymer, a thermoplastic polyurethane, a polyetherester and a polyether-block copolymide.

3. The method of claim 1 wherein said polyethylene glycol has an average molecular weight with the range of 100-2,000.

4. The method of claim 1 wherein said polyethylene glycol has an average molecular weight with the range of 150-700.

5. The method of claim 1 further comprising introducing at least one ultraviolet (UV) stabilizer into said mold cavity in an amount of no more than 0.5 weight percent based upon the amount of olefin polymer supplied to said mold cavity.

6. The method of claim 1 wherein said olefin polymer comprises an ethylene or propylene homopolymer or copolymer prepared by the polymerization of ethylene or propylene in the presence of a metallocene based polymerization system.

7. The method of claim 2 wherein the minor component of said densification aid comprises a thermoplastic polyurethane in an amount less than the amount of said polyethylene glycol.

8. The method of claim 2 wherein said minor component of said densification aid comprises a polyetherester in an amount less than the amount of said polyethylene glycol.

9. The method of claim 2 wherein said minor component of said densification aid comprises a polyether block copolyamide in an amount less than the amount of said polyethylene glycol.

10. The method of claim 1 further comprising introducing a UV stabilizer into said mold cavity concomitantly with the introduction of said polymer composition and said densification aid.

11. The method of claim 10 wherein said UV stabilizer is introduced into said mold cavity in an amount within the range of 0.025-0.5 weight percent based upon the amount of said olefin polymer.

12. The method of claim 10 wherein said UV stabilizer is a hindered amine light stabilizer.

13. The method of claim 1 wherein said olefin polymer composition comprises a first olefin polymer and a second polymer which is different from said processing aid and said first olefin polymer which is present in an amount less than said first olefin polymer and said second polymer is selected from the group consisting of a polyamide, a copolyamide, a polyolefin, a copolymer of ethylene and vinyl acetate or vinyl alcohol, polystyrene, polycarbonate, and polyvinyl chloride.

14. A method for the preparation of a molded article formed of an olefin polymer comprising:
   a) providing a particulate molding feedstock comprising a mixture of an α-olefin polymer composition, wherein the olefin polymer composition is selected from ethylene homopolymers, propylene homopolymers or copolymers of ethylene or propylene and $C_2$-$C_8$ olefin polymers and a densification aid comprising a polyethylene glycol in an amount of less than 1 weight percent based upon the amount of said olefin polymer composition;

b) introducing said molding feedstock into the mold cavity of a rotational mode;
c) rotating said mold about at least one axis;
d) during the rotation of said mold, heating said olefin polymer composition incorporating said densification aid to a temperature sufficient to provide a molten state of said polymer composition to form a molded article configured to the shape of said mold cavity;
e) thereafter cooling said molten polymer composition within the confines of said mold cavity to a temperature effective to solidify said olefin polymer composition within the confines of said mold cavity; and
f) retrieving said solidified molded article from said mold cavity;
wherein subsequent to the introduction of said olefin polymer composition and said densification additive into said mold cavity, said polymer is heated to a sintering temperature in which individual particles of said olefin polymer are coaleased followed densification of said molten polymer and the increase of the temperature in said mold cavity to a peak internal air temperature within said mold cavity followed by the cooling of said mold cavity to a crystallization temperature for the solidification of said molten polymer to produce said molded article wherein the peak internal air temperature within said mold cavity to produce a designated number of air bubbles within said molten polymer is reduced by an increment of at least 10° C. from the peak internal air temperature required to produce the designated number of air bubbles for a polymer molded under identical conditions without the introduction of said densification aid into said mold cavity.

15. The method of claim 14 wherein said densification aid comprises said polyethylene glycol as a major component and in addition comprises a minor component selected from the group consisting of a thermoplastic polyurethane, a polyetherester, a polyethylene block copolyamide, and a fluoropolymer.

* * * * *